US005475820A

United States Patent [19]
Natrasevschi et al.

[11] Patent Number: 5,475,820
[45] Date of Patent: Dec. 12, 1995

[54] METHOD FOR USING ONE OF TWO STORAGE DIRECTORIES ONLY AFTER THE OTHER DIRECTORY IS FULL FOR WRITE MANAGEMENT IN A DISK DEVICE

[75] Inventors: Alfred Natrasevschi, Ft. Collins; Bradfred W. Culp, Greeley; Kevin S. Saldanha; Allen J. Piepho, both of Ft. Collins; Terry L. Loseke, Lovelend, all of Colo.

[73] Assignee: Hewlett-Packard Company, Palo Alto, Calif.

[21] Appl. No.: 180,520

[22] Filed: Jan. 12, 1994

Related U.S. Application Data

[63] Continuation of Ser. No. 12,962, Jan. 29, 1993, abandoned, which is a continuation of Ser. No. 583,904, Sep. 17, 1990, abandoned.

[51] Int. Cl.$^6$ .................................................... G06F 12/06
[52] U.S. Cl. .................. 395/427; 395/700; 395/497.01; 395/497.04; 364/768.8; 364/236.2; 364/944.3; 364/966.8; 364/DIG. 2
[58] Field of Search ............................ 365/122; 395/275, 395/700; 369/275.1, 275.2, 275.3, 275.4, 275.5; 345/425

[56] References Cited

U.S. PATENT DOCUMENTS

| | | | |
|---|---|---|---|
| 4,601,012 | 7/1986 | Aiken, Jr. | 364/900 |
| 4,682,305 | 7/1987 | Ishikawa | 364/900 |
| 4,733,386 | 3/1988 | Shimoi | 369/47 |
| 4,742,215 | 5/1988 | Daughters et al. | 235/487 |
| 4,760,566 | 7/1988 | Kobayashi et al. | 369/48 |
| 4,807,205 | 2/1989 | Picard | 369/32 |
| 4,831,611 | 5/1989 | Sasaki et al. | 369/54 |
| 4,932,014 | 6/1990 | Tamiya | 369/48 |
| 4,937,804 | 6/1990 | Ishihara | 369/48 |
| 4,949,326 | 8/1990 | Takagi et al. | 369/54 |
| 4,958,314 | 9/1990 | Imai et al. | 369/32 |
| 5,023,854 | 6/1991 | Satoh et al. | 369/32 |
| 5,029,125 | 7/1991 | Scinpac | 395/600 |
| 5,040,110 | 8/1991 | Miki et al. | 369/111 |
| 5,091,635 | 2/1992 | Akatsuka et al. | 369/59 |
| 5,119,291 | 6/1992 | Flannagan et al. | 395/275 |
| 5,150,339 | 9/1992 | Ueda et al. | 369/32 |
| 5,179,533 | 1/1993 | Bullington et al. | 365/110 |
| 5,233,576 | 8/1993 | Curtis et al. | 369/13 |
| 5,265,230 | 11/1993 | Saldanha et al. | 395/425 |

OTHER PUBLICATIONS

John Angerny & Kevin Jaeger, *MS–DOS Developer's Guide*, pp. 285–303.
Microsoft MS–DOS User's Guide–Microsoft Corporation 1987—pp. 33–34.

*Primary Examiner*—Thomas C. Lee
*Assistant Examiner*—Sang Kim

[57] ABSTRACT

Disclosed is a system that stores write management information identifying which sectors have been written and which sectors are available to be written in a magneto-optical disk with write-once-read-many (WORM) capability. The write management information is stored in a separate write management directory on the media, which is typically loaded into the drive controller memory when the media is first loaded into the drive. Whenever the drive receives a write command, it checks the write management directory to determine if the sector has already been written. If the directory indicates that the sector has already been written, the drive returns an error, otherwise, the drive writes the sector and updates the write management directory. In the preferred embodiment, two separate methods are used to indicate that a sector has been written.

18 Claims, 8 Drawing Sheets

METHOD FOR USING ONE OF TWO STORAGE DIRECTORIES ONLY AFTER THE OTHER DIRECTORY IS FULL FOR WRITE MANAGEMENT IN A DISK DEVICE

CROSS REFERENCE TO RELATED APPLICATION

This is a continuation of application Ser. No. 08/012,962 filed on Jan. 29, 1993, now abandoned, which is a continuation of impending application Ser. No. 07/583,904 filed on Sep. 17, 1990, now abandoned.

BACKGROUND OF THE INVENTION

This invention relates to data storage devices and more particularly to optical disk data storage devices. Even more particularly, the invention relates to an apparatus and method for restricting the writing of information on optical disk media.

An optical disk is a data storage medium which is readable by a lasern-based reading device. Optical disks, known as "compact disks" or "CD's", have become increasingly popular during the last few years for recording music and audio-visual works. Due to the huge storage capacity of optical disks as compared to conventional magnetic storage media, optical disks known as "ROM disks" have become popular for storing computer readable information. Recent technology has produced optical disks which can be written as well as read by the computer, thus, in the future optical disks are expected to become increasingly more important in the computer industry and may eventually replace magnetically readable and writable storage media such as "floppy disks" and "hard disks". Optical disks of the type used in computer applications are generally mounted in cartridges, and the reading devices generally read or write data through a slot provided on a surface of the cartridge.

One type of optical disk is often called "WORM" disks for Write-Once-Read-Many. WORM media is a type that can be written but cannot be erased, therefore, it can be written only once. If an attempt is made to write on this media a second or subsequent times, the new data is written over the old data, resulting in garbled data which is unintelligible. A significant need exists for WORM media, however. This type of media is very useful for archive storage of data, wherein the data is intended to be written only once and never erased. A very significant aspect of WORM media, is that it always leaves an audit trail. Since it can only be written once, the data in a sector will always be the original data written in the sector. If a rewrite of the sector was attempted, it will be obvious from the garbled data and the CRC check data, which will be incorrect. In no case can the data in a sector be changed without leaving evidence of the change.

Recently a new type of optical disk media has been developed, called magneto-optic media or "MO" media. This type of media can be written, erased, and rewritten many times, in the same manner as magnetic media. Magneto-optic media is very important as a direct replacement for magnetic media, since it performs the same functions and allows a much larger storage capacity on a given disk.

Both WORM and magneto-optic media have important applications, however, it is very difficult and costly to design a single disk drive that can process both types of media.

Another aspect is that WORM media is implemented in as many combinations of technology and formats as there are manufacturers. Hence, interchangability between systems is not possible. This lack of standardization in the WORM field is in striking contrast to the firmly established standard in the MO field, where there is full interchangability between manufacturers.

There is a need then for a single media which can function either as WORM media, or as rewritable media. Also, there is need for a WORM implementation in the well standardized MO technology. Various features and components of such a media are disclosed in U.S. patent application Ser. No. 07/426,834, filed Oct. 25, 1989, for MULTI-FUNCTION OPTICAL DISK DRIVE AND MEDIA of Hoyle L. Curtis and Terry Lynn Loseke, which is hereby specifically incorporated by reference for all that is disclosed therein now abandoned.

A similar problem has been addressed with magnetic media. Floppy disks for example, have a write protect notch which, if covered, prevents writing on the media. Therefore, a device can write on the media while the notch is uncovered, and then the notch can be covered to make the media "read-only". Magnetic tape has solved this problem in a similar way with a write ring, or in the case of tape cartridges with a record slide switch. These methods all suffer from the same drawback, that is, the mechanism is very easily reversed to make the media writable once again. In many operating systems, for example DOS on personal computers, a file can be marked as read-only after it has been initially written. Again, however, the read-only status is very temporary and can easily be reversed with another operating system command. Because the mechanism is easily reversed in all these cases, there is no audit trail.

This problem has also been partially addressed in a device, manufactured by Canon, Inc., called the "Canofile 250". This device allows an entire disk to be formatted as write-once. This device would appear to have two serious drawbacks, however. The process of formatting a disk is usually done by an operating system within the computer, which means that the write-once format is known only to that operating system, and other operating systems, not knowing of this format, might write over the media, leaving no audit trail. Another problem with this device is that the write-once status only applies to the entire media, therefore the media cannot be divided into write-once and rewritable portions.

Another problem that exists in converting rewritable media to write-once media is that drives that were manufactured prior to the design of the convertible media will not understand that the media is convertible and may write on the media even though it has been marked as read-only. This problem is similar to the above described problem wherein the operating system simply sets a bit identifying a file as read-only. Because the previously manufactured drive is unaware of the mechanism by which the media is converted to read-only, it will ignore such mechanism and write on the media. Therefore, one of the most difficult problems being faced in providing a convertible media, is the problem of designing a mechanism which will be recognized by previously manufactured drives.

It is very desirable, then, to provide a system that will allow media to be converted from rewritable media to write-once media. Because the nature of its construction, WORM media is incapable of being written to more than once. Magneto-optic media, however, can be rewritten many times. Therefore, there is need in the art to provide apparatus and method for allowing magneto-optic media to be converted to write-once media. There is a further need in the art for allowing portions of the media to be converted to read-only, while retaining other portions of the media as rewritable. A still further need in the art is to allow each sector of the magneto-optic media to be independently converted to read-only.

SUMMARY OF THE INVENTION

It is an object of the present invention to provide an apparatus and method of restricting the writing of data on optical media.

It is another object of the present invention to provide apparatus and methods for defining writable media as read-only media.

Still another object of the invention is to provide apparatus and methods for defining portions of writable media as read-only media.

Yet another object of the invention is to provide apparatus and methods for dynamically changing a portion of the media from writable to read-only.

A further object of the invention is to provide apparatus and methods to define writable media wherein each data sector of such media can be redefined from writable to read-only.

A still further object of the invention is to provide a data structure, stored on the media, that defines which sectors of the media have been written and which sectors are available for writing.

Still another object of the invention is to provide apparatus and methods for erased sector management on rewritable media.

The above and other objects of the invention are accomplished in a system that stores information identifying which sectors have been written and which sectors are available to be written. This information is stored in a separate write management directory on the media. When the media is first loaded into the drive, this write management directory is loaded from the media into RAM within the disk drive controller. Thereafter, whenever a write command is received by the drive, the drive checks the directory to determine if the sector has already been written. If the directory indicates that the sector has already been written, the drive returns an error. Otherwise, the drive writes the sector and updates the write management directory.

In the preferred embodiment, two separate methods are used to indicate that a sector has been written. The write management directory contains pairs of pointers, each pair defining a contiguously written area of the media. Also, each sector within the media contains information, typically a flag bit, that indicates whether the sector has been previously written. When a write command is received by the drive, it first checks the write management directory and determines whether the address of the sector to be written lies within any of the contiguous areas defined by the pointers. If the sector does lie within any of the contiguous areas, the drive returns an error since the sector has been previously written. If the sector is outside the contiguous areas, the drive determines whether a new set of pointers needs to be created for a new contiguous area. If there is room in the write management directory, a new set of pointers is created. If the directory has become full, the use of the directory is discontinued, and the flag bit within the sectors is then used. In this manner, the write management directory size can be limited while still providing coverage for all sectors on the disk.

In another embodiment, the write management directory pointers are used, however, sufficient space in the directory is allowed for the worst case size of the directory. Since the maximum directory size is allocated on the media, there is no need for a flag bit in each sector.

In yet another embodiment, the write management directory contains a bit for each sector on the media. If the sector has been written, the bit is set to a logical one, otherwise, the bit is set to logical zero. When the drive receives a write command for a sector, it finds the bit corresponding to the sector and examines the bit to determine whether the sector has been previously written.

In still another embodiment, the disk is logically divided into zones, and a pointer is kept for each zone. The pointer points to the next sector in the zone that may be written, thus, when the drive receives a write command for a sector, if the sector number is greater than or equal to the pointer value, the sector may be written.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

Figure 1:
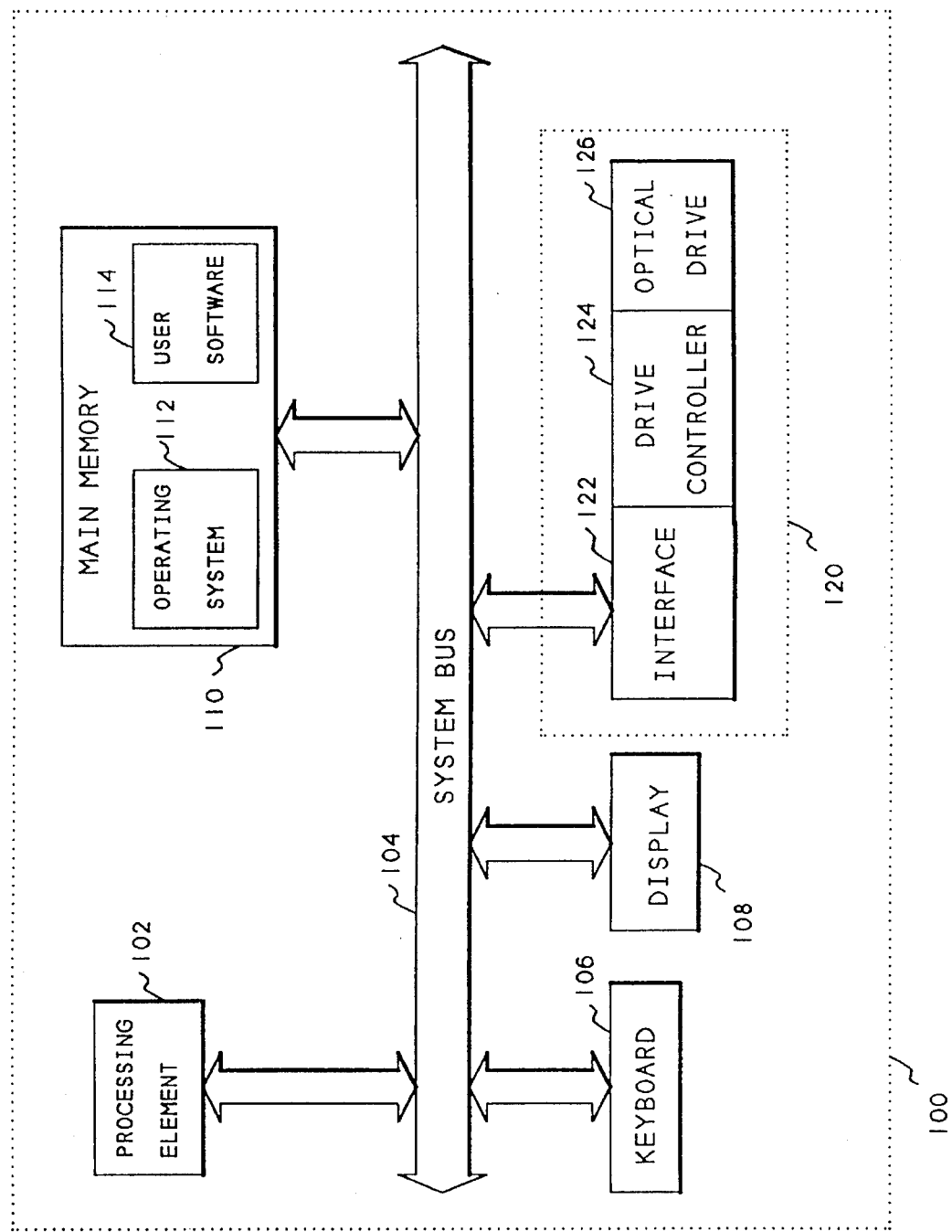
FIG. 1 is a block diagram of a computer system that incorporates the present invention.

The following description is of the best presently contemplated mode of carrying out the present invention. This description is not to be taken in a limiting sense but is made merely for the purpose of describing the general principles of the invention. The scope of the invention should be determined by referencing the appended claims.

In general, the invention comprises a system that allows rewritable media to be converted to write-once media or to manage erased sectors on rewritable media. The system performs this function by storing information identifying which sectors of the media have been written and which sectors are available to be written. This information is stored in a separate write management directory on the media. When the media is first loaded into the drive, the write management directory is loaded from the media into RAM within the disk drive controller. Thereafter, whenever a write command is received by the drive, it checks the directory to determine if the sector has already been written. If the directory indicates that the sector has already been written, the drive returns an error. Otherwise, the drive writes the sector and updates the write management directory.

In a first embodiment, the write management directory contains a bit for each sector on the media. If the sector has been written, the bit is set to a logical one, otherwise, the bit is set to logical zero. When the drive receives a write command for a sector, it finds the bit corresponding to the sector and examines the bit to determine whether the sector has been previously written.

In a second embodiment, the write management directory contains pairs of pointers, each pair defining a contiguously written area of the media. Sufficient space is provided in the write management directory for the worst case size of the directory.

In a third, preferred, embodiment, two separate methods are used to indicate that a sector has been written. The write management directory contains pairs of pointers, each pair defining a contiguously written area of the media, as in the second embodiment. Also, each sector within the media contains information, typically a flag bit, that indicates whether the sector has been previously written. When a write command is received by the drive, it first checks the write management directory and determines whether the address of the sector to be written lies within any of the contiguous areas defined by the pointers. If the sector does lie within any of the contiguous areas, the drive returns an error since the sector has been previously written. If the sector is outside the contiguous areas, the drive determines whether a new set of pointers needs to be created for a new contiguous area. If there is room in the write management directory, a new set of pointers is created. If the write management directory has become full, its use is discontinued, and the flag bit within the sectors is then used. In the manner, the write management directory size can be limited while still providing coverage for all sectors on the disk.

A primary advantage of the preferred embodiment, is write management information redundancy. If either the write management directory or the flag bits are lost, they can be recovered by referencing the other information. That is, should the write management directory become unusable, the flag bits of all sectors can be scanned and a new directory created. Furthermore, if the flag bits become unusable, the directory can be used to recreate the flag bits for all sectors on the disk unless the directory has become full. Also, in the normal case, this type of media will be written sequentially, so that the write management directory will contain only a pair of pointers or at most a few pairs of pointers. Another advantage of the preferred embodiment is that write operations are performed in a single pass until the write management directory becomes full.

In a fourth embodiment, the disk is logically divided into zones, and a pointer is kept for each zone. The pointer points to the next sector in the zone that may be written, thus, when the drive receives a write command for a sector, if the sector number is greater than or equal to the pointer value, the sector may be written.

FIG. 1 shows a block diagram of a computer system that incorporates the present invention. Referring now to FIG. 1, a computer system 100 is shown having a processing element 102. Data is transferred between the processing element 102 and all other parts of the system by a system bus 104. Attached to the system bus 104 is a keyboard 106 which allows a user to input data to the computer system 100. Also attached to the system bus 104 is a display 108 which allows the computer system 100 to display data to the user. A main memory 110 is attached to the system 104 and is used to store data and programs. Stored in the main memory 110 is an operating system 112 and user software 114. Also attached to the system bus 104 is the optical data storage device 120 of the present invention. Within the optical data storage device 120 is an interface 122 which connects the optical data storage device 120 to the system bus 104. Attached to the interface 122 is the drive controller 124 which contains all the electronics and firmware for controlling the optical drive 126.

Figure 2:
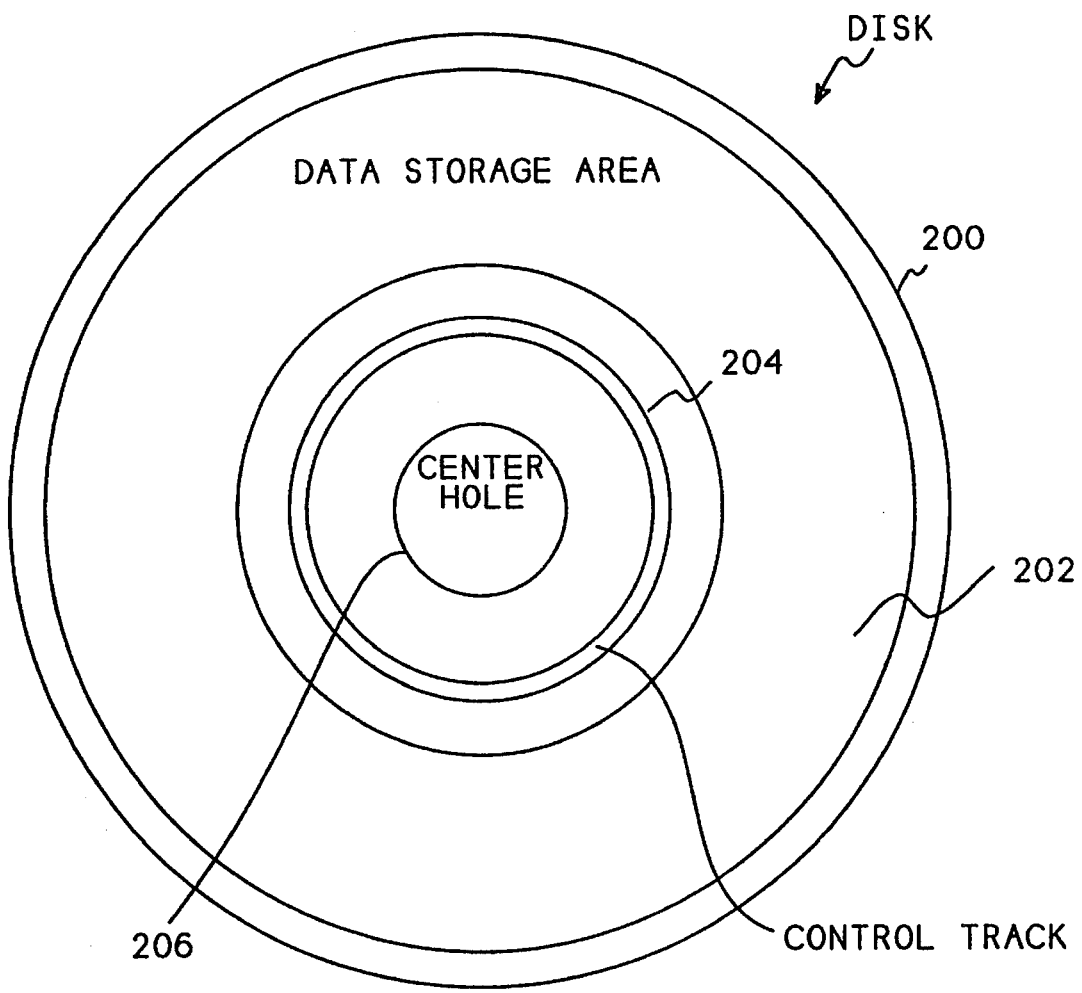
FIG. 2 is a diagram of an optical disk for use with the present invention.

FIG. 2 is a diagram of an optical disk storage media suitable for use with the present invention. Referring now to FIG. 2, disk 200 contains a data storage area 202 used to store user data in sectors. The write management directory of the present invention is a part of the data storage area 202. Outside the data storage area 202, and located toward the center of the disk 200, is a control track 204 which contains a media descriptor table which contains an indicator that the media is magneto-optical with write-once-read-many (WORM) capability. A center hole 206 is used to center the media on the spindle of the optical drive 126 (FIG. 1). The disk 200 is typically surrounded by a cartridge (not shown) to protect the disk during storage. The data storage area 202 and the control track 204 are accessible through a slot in the cartridge.

Figure 2A:
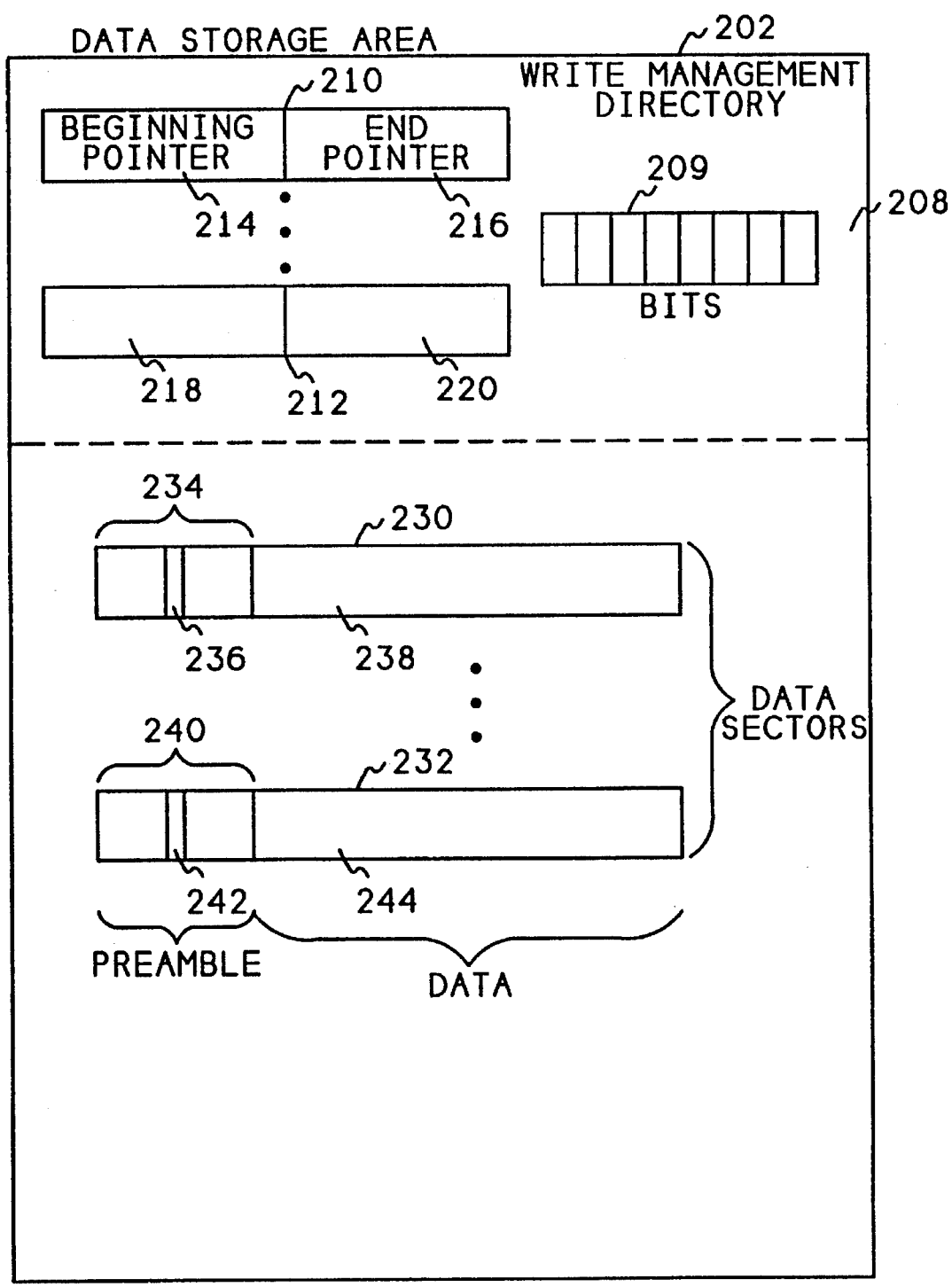
FIG. 2A shows an expanded view of the data storage area 202 of FIG. 2.

FIG. 2A shows an expanded view of the data storage area 202. Referring now to FIG. 2A, the data storage area 202 contains a write management directory 208, and a plurality of data sectors, for example data sectors 230 and 232. The write management directory 208, which can be contained within data sectors located anywhere within the data storage area 202, may contain a plurality of bits, for example bits 209, for use with the first embodiment described above.

Alternatively, the write management directory 208 may contain a plurality of pairs of pointers, for example pointer pairs 210 and 212, for use with the second and third embodiments described above.

Each of the pointer pairs contains a beginning pointer, for example pointers 214 and 218, which points to the first sector of a contiguous area, and each of the pointer pairs contains an end pointer, for example pointers 216 and 220, which points to the last sector of a contiguous area.

Each of the sectors, for example sectors 230 and 232, is organized in the same manner as a typical sector in a magnetic disk, wherein the sector contains a preamble area, for example areas 234 and 240, and a data area, for example data areas 238 and 244. Within the preamble area, each sector contains a flag bit, for example 236 and 242.

Figure 3:
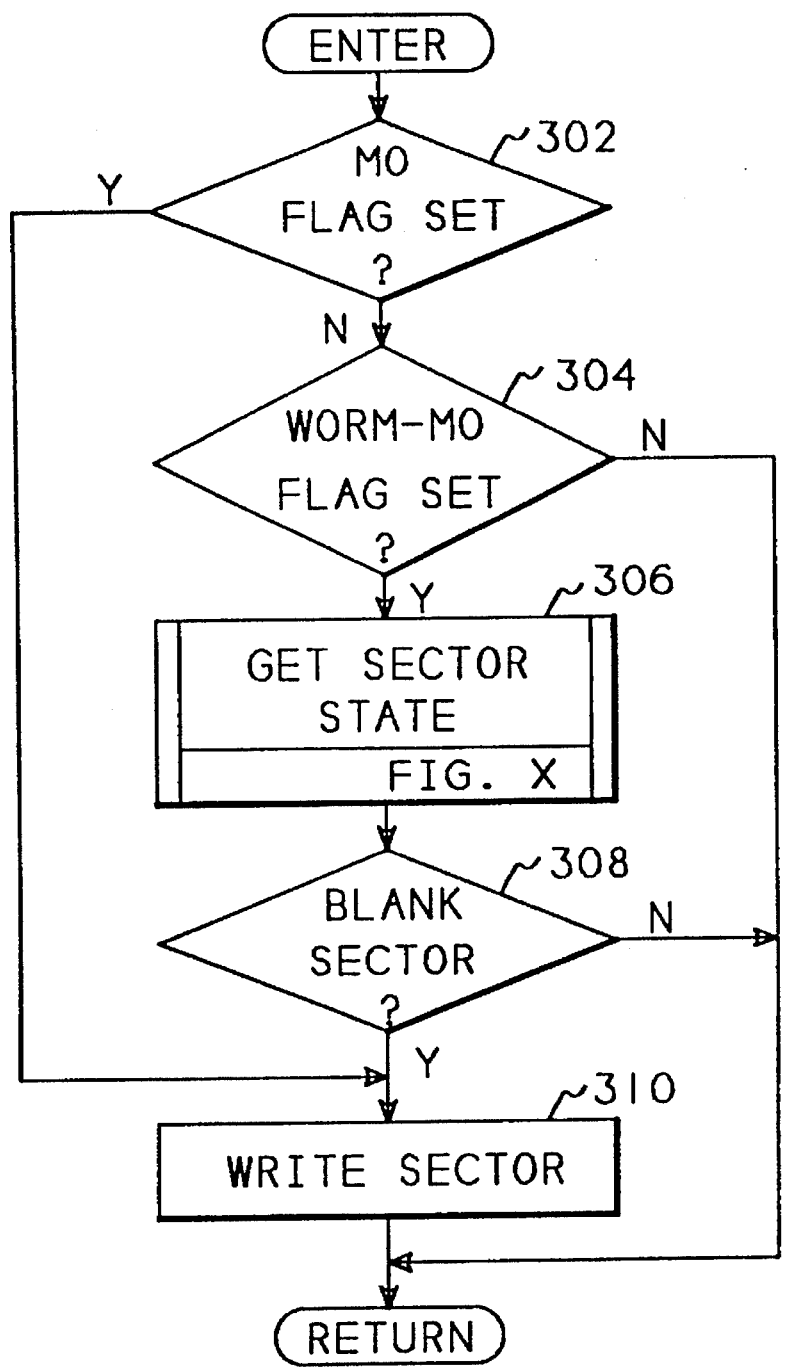
FIG. 3 shows a flowchart of a write operation in the present invention.

FIG. 3 shows a flowchart of a write operation in an optical drive of the present invention. Referring now to FIG. 3, after entry, block 302 checks the MO flag within the media to determine whether this is conventional magneto-optic media. If the media is conventional magneto-optic, block 302 transfers to block 310 to simply write the sector. If the media is not conventional MO media, block 302 transfers to block 304 which determines whether the WORM MO flag has been set. The WORM MO flag identifies this as magneto-optic memory capable of being re-formatted into write-once-read-many (WORM) media. If the WORM MO flag is not set, block 304 returns to the caller since this media cannot be used by the drive. If the WORM MO flag is set, block 304 transfers to block 306 which calls either FIG. 4, FIG. 5, or FIG. 6 to get the state of the sector being written. In the preferred embodiment, block 306 will call FIG. 6. When using the bit mapped directory of the first embodiment, block 306 will call FIG. 4. When using the pointers only directory of the second embodiment, block 306 will call FIG. 5.

After determining the sector state, block 308 determines whether the sector is blank, and if the sector is not blank, block 308 returns to the caller since the sector cannot be written without overwriting pre-existing data. If the sector is blank, block 308 transfers to block 310 which writes the sector and then returns to the caller. The write in block 310 could be either a conventional write or a write with verify.

Figure 4:
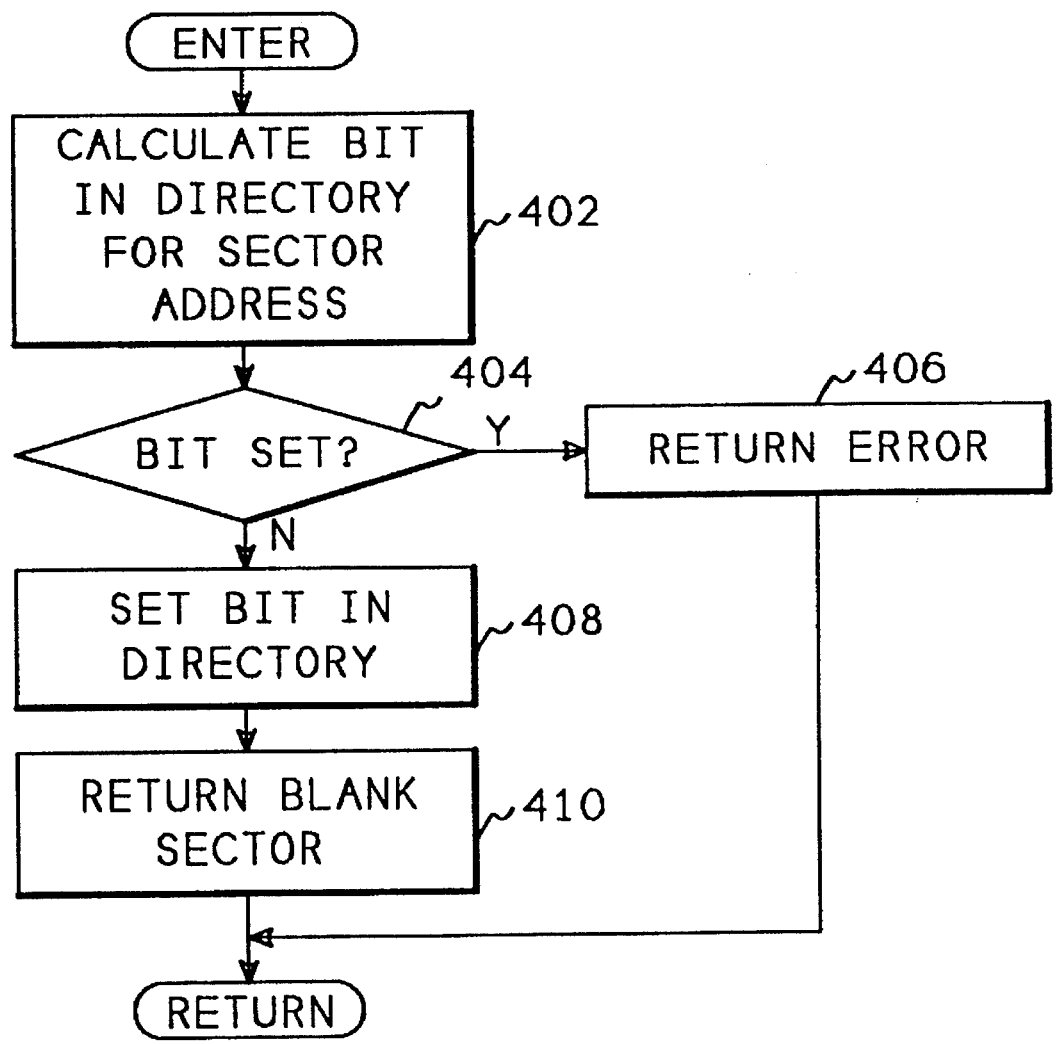
FIG. 4 shows a flowchart of determining sector status using a bit mapped directory.

FIG. 4 shows a flowchart of the process of determining the sector status using the bit mapped directory of the first embodiment. Referring now to FIG. 4, after entry, bit 402 calculates the bit in the write management directory which corresponds to the sector being written. Ordinarily, when the media is inserted into the drive, the directory will be loaded into memory within the drive controller. Therefore, the bit will be contained in drive controller memory and this calculation simply involves addressing the correct byte and bit of the directory within the memory. If the directory is not located in memory, the correct byte containing the bit corresponding to this sector would first be read from the drive. After calculating the bit, the bit is retrieved and block 404 determines whether the bit is set. If the bit is set, block 404 transfers to block 406 which returns an error, because the sector is already written. If the bit is not set, block 404 transfers to block 408 which sets the bit and then block 410 returns an indication that the sector is blank.

Figure 5:
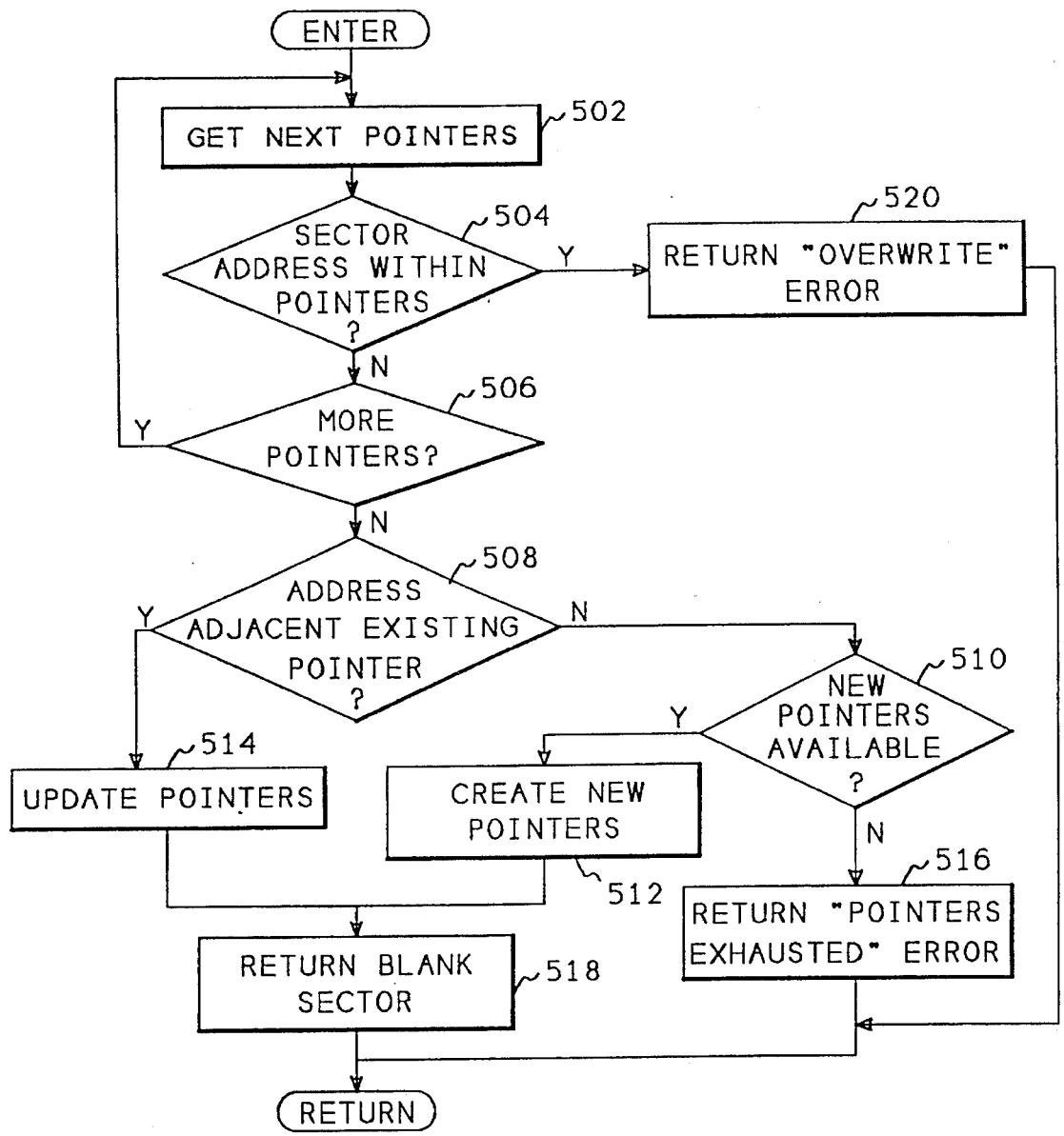
FIG. 5 shows a flowchart of determining sector status using a pointers directory.

FIG. 5 shows a flowchart of the process of determining sector status in the second embodiment wherein the directory contains pointers to the sectors that have been written. In this embodiment, the pointers are stored in pairs, with the first pointer of the pair pointing to the beginning of a contiguously written area, and the second pointer pointing to the end of a contiguously written area. Referring now to FIG. 5, after entry, block 502 gets the first or next pair of pointers from the write management directory. Ordinarily, when the media is inserted into the drive, the directory will be loaded into RAM within the controller. Therefore, obtaining the next pointer pair simply involves obtaining them from RAM. After getting the next pair of pointers, block 504 determines whether the address of the sector being written is contained within the range of the two pointers. If the sector address is between these two pointers, the sector has been previously written, and block 504 transfers to block 520 which returns an overwrite error. If the sector is not within this pair of pointers, block 504 transfers to block 506 which determines whether the directory contains additional pairs of pointers. If the directory does contain additional pointers, block 506 transfers back to block 502 to check the next pair. If no more pointers exist, then the sector can be written so block 506 transfers to block 508.

Block 508 determines whether the address of the sector being written is adjacent to an existing pointer. If the address is adjacent an existing pointer, block 508 transfers to block 514 which simply updates this existing pointer and then transfers to block 518 which returns a blank sector indication to the caller. If the address is not adjacent an existing pointer, block 508 transfers to block 510. Block 510 determines whether more pointer areas are available in the directory. If additional pointer areas are available in the directory, block 510 transfers to block 512 which creates a new pair of pointers for the new area and then transfers to block 518 which returns a blank sector indicator to the caller. If additional pointers are not available, block 510 transfers to block 516 which returns a pointers exhausted error to the caller.

Figure 6:
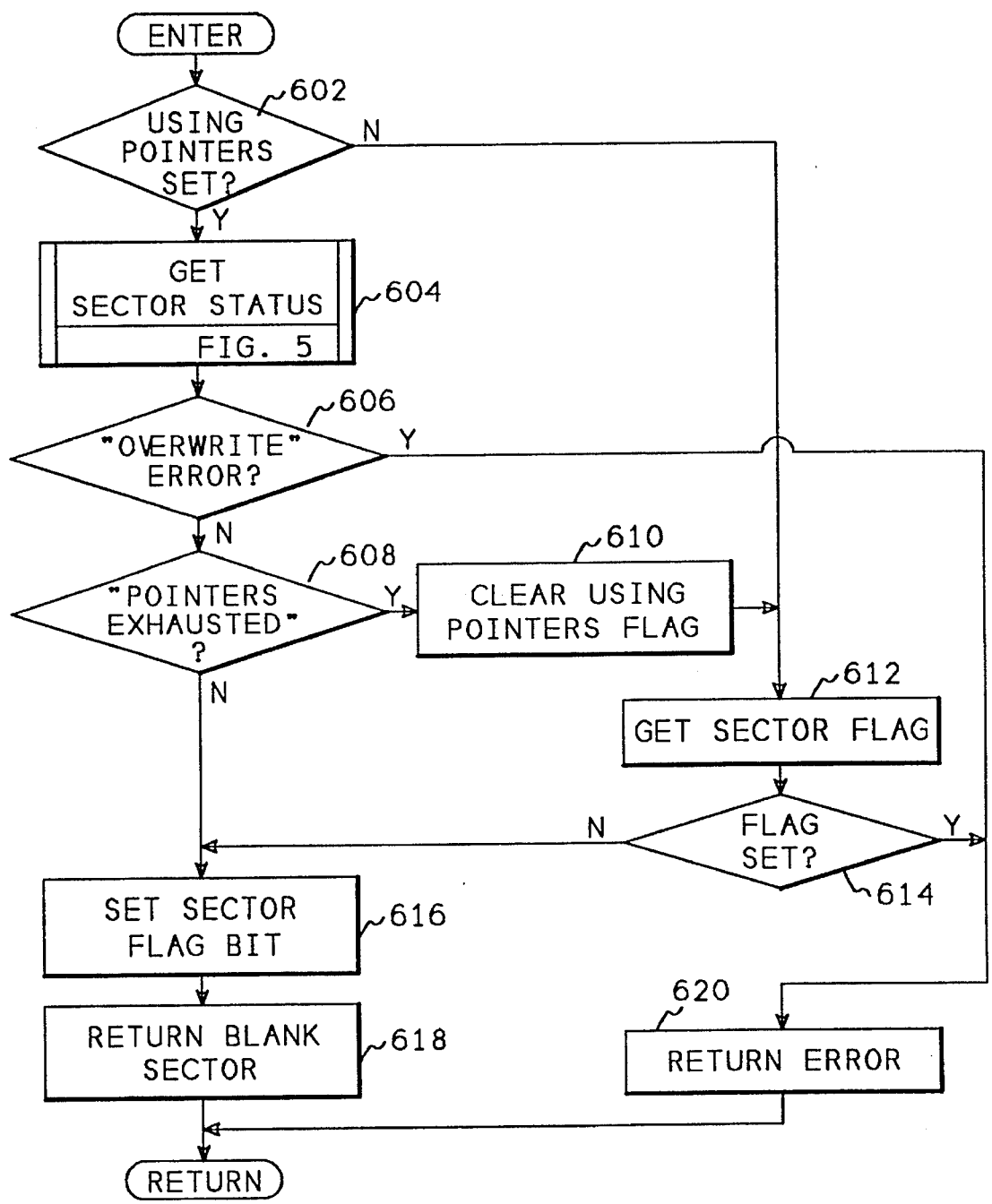
FIG. 6 shows a flowchart of determining sector status using the directory of the preferred embodiment.

FIG. 6 shows a flowchart of the hybrid structure of the preferred, third, embodiment of the present invention. Referring now to FIG. 6, after entry, block 602 determines whether the using pointers flag is set. If the using pointers flag is set, the pointers area of the write management directory is being used, so block 602 transfers to block 604 which calls FIG. 5 to get the sector status of the sector being written. Block 606 then determines whether FIG. 5 returned an overwrite error and if so, block 606 transfers to block 620 which returns the error to caller. If an overwrite error did not occur, block 606 transfers to block 608 which determines whether a pointers exhausted error was returned. If a pointers exhausted error was not returned, block 608 transfers to block 616 which sets the flag in the sector and then transfers to block 618 which returns a blank sector indicator allowing the sector data to be written. If a pointers exhausted error did occur, block 608 transfers to block 610 which clears the using pointers flag. Since the pointers in the write management directory have been exhausted, the system must switch to using the flag bits contained within each sector of the media. Therefore, future write operations will not check the pointer section of the write management directory, but will transfer directly to block 612 which checks the flag bit within a sector. After clearing the using pointers flag, block 610 transfers to block 612.

Control transfers to block 612 whenever the write management directory is no longer being used. Block 612 reads the sector flag from the sector that was addressed. Block 614 then determines whether the flag within the sector is set and if the flag is set, block 614 transfers to block 620 which returns an error since the sector has already been written. If the flag is not set, block 614 transfers to block 616 which sets the flag and rewrites it into the sector before transferring to block 618 which returns a blank sector indicator allowing the sector to be written. The flag bit could be created in a variety of ways, as those skilled in the art will recognize. Ordinarily the flag bit would be stored within the sector, however, it may be stored at another location on the media.

In a fourth embodiment, the disk is configured into zones, with each zone having a single pointer that indicates the next available blank or erased sector in the zone. Computer systems have differing requirements for the location of directory and data areas. Directory areas require frequent updating, while user data areas are updated less often. It is advantageous to separate areas on the disk with different update rates to optimize for performance. The disk can be configured into zones during a format operation according the computer system needs.

During a format command, information on the number of zones on the disk is stored in a pointer definition sector or sectors (PDS), which are organized to have a status byte, the number of zones on the disk, a time stamp, and a plurality of pointers, one for each zone on the disk. The time stamp is used to indicate the last time the disk was formatted. The size of each zone is determined by dividing the formatted user capacity of the disk by the number of zones indicated in the PDS sector. The last zone on the disk will have the leftover sectors if the division does not produce a round number. When the disk is formatted, all sectors in the data and spare areas of the disk are erased. Therefore, a newly formatted disk will have all pointers set to the first sector in each zone.

When the disk is inserted into a drive, the drive reads the PDS sectors to find out how the disk is zoned and to find the first available sector for a write in each zone. Also, if the PDS status byte indicates that the PDS sectors were not updated after the disk was last used, the drive initiates recovery sequences to update the PDS sectors. The drive will then set the status byte to indicate that the disk is open before allowing any operations on the disk, therefore, if the disk is not updated after these operations the status will clearly indicate that error recovery will be needed on the next insertion of the disk. After all operations, the PDS sectors will be updated, and the status will be set to indicate that the disk has been updated.

When a write command is received, the drive first reads the contents of the PDS into its own memory (if the PDS is not already in memory) to find out if the target sector in a zone occurs before the pointer in that zone. If the target sector is before the pointer, a blank check of the sectors can be performed to decide whether to write. If the sector to be written is located at or after the pointer in the zone, the write proceeds immediately since the sector is known to be available. After the write operation, the zone pointer in the PDS is updated in memory. Before the disk is removed from the drive, the PDS sectors will be rewritten to the disk.

In this manner, in applications where large portions of the disk are written sequentially and updated infrequently, considerable performance improvement can be realized since any writes that occur after the pointer occur immediately without further action on the disk.

Figure 7:
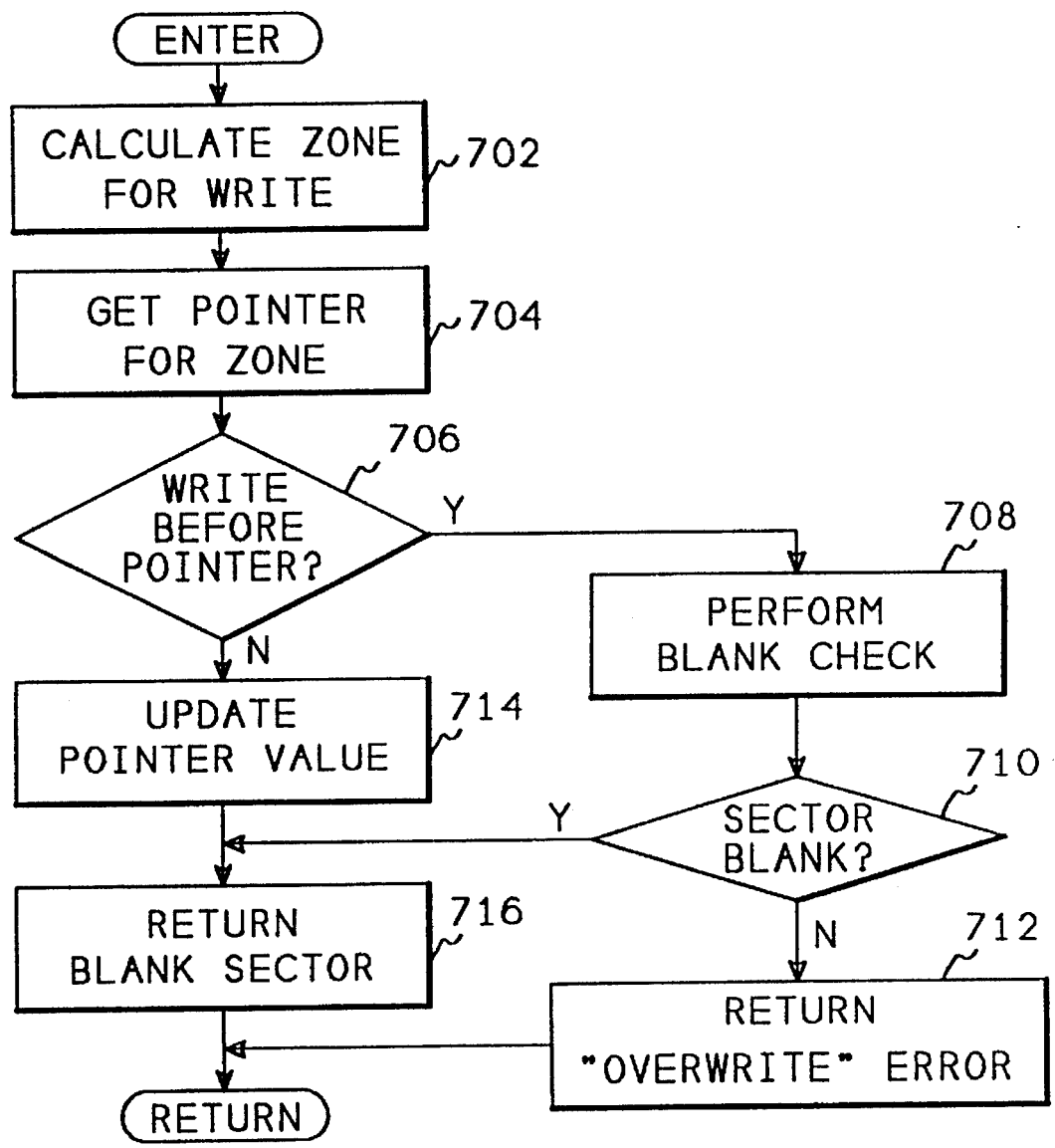
FIG. 7 shows a flowchart of determining sector status using the zone and pointer method.

FIG. 7 shows a flowchart of the write operation using zones. Referring now to FIG. 7, after entry, block 702 calculates the zone for the sector to be written. Block 704 then gets the pointer within the zone and block 706 determines whether the write will occur prior to the pointer. If the write will occur prior to the pointer, block 706 transfers to block 708 which performs a blank check by reading the disk to determine whether the sector is currently blank. If the sector is currently blank, block 710 transfers to block 716 which returns the blank sector indicator. If the sector is not blank, block 710 transfers to block 712 which returns an overwrite error. If the write is occurring after the pointer within the zone, block 706 transfers to block 714 which updates the pointer with a new value and then block 716 returns the blank sector indicator.

The flowcharts of FIGS. 4, 5, 6 or 7 could also be used during a read command to determine, after a read error, if the sector contains data or if it is blank. This determination would allow the drive to decide whether or not error correction should be attempted, since avoiding unnecessary error correction would improve read performance.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A system for storing data on media disposed within a data storage device, said system comprising:

a plurality of first storage state indicators, wherein each of said plurality of first storage state indicators stores a storage state of one or more of a plurality of predefined data storage portions of said media;

a plurality of second storage state indicators, one corresponding to each of said predefined data storage portions of said data storage media;

selection means within said data storage device for selecting one of said first storage state indicators or one of said second storage state indicators as a selected storage state indicator for storing a state of a selected data storage portion, wherein said selection means selects one of said first storage state indicators so long as at least one of said first storage state indicators is unused and wherein said selection means selects one of said second storage state indicators when there are no unused first storage state indicators; and means within said data storage device for storing a read-only state into said selected storage state indicator when said data storage device writes data into said selected data storage portion of said data storage media.

2. The system of claim 1 wherein said plurality of first storage state indicators are stored in a directory at a central location on said media.

3. The system of claim 1 wherein said plurality of second storage state indicators each comprise one bit of information.

4. The system of claim 1 wherein each of said predefined data storage portions comprises a sector of said media.

5. The system of claim 1 wherein said plurality of first storage state indicators comprises a plurality of pairs of pointers, and wherein a first pointer of each of said pairs points to a start of one of said plurality of predefined data storage portions, and a second pointer of each of said pairs points to an end of said one of said plurality of predefined data storage portions.

6. The system of claim 5 wherein each of said predefined data storage portions comprises one or more sectors of said media.

7. The system of claim 1 wherein said second storage state indicator means is located within each of said predefined data storage portions of said data storage media.

8. The system of claim 7 wherein said second storage state indicator means comprises a flag bit within each of said predefined data storage portions of said data storage media.

9. The system of claim 1 wherein each of said predefined data storage portions comprises a zone.

10. The system of claim 9 wherein each of said plurality of first storage state indicators comprises a pointer to one of said zones and further wherein said pointer points to a first writable location in said zone.

11. A process for storing data in a read-only form on writable media, said process comprising the steps of:

(a) subdividing said media into a data area and a write management directory;

(b) subdividing said data area into a plurality of data storage portions;

(c) defining a plurality of first storage state indicators within said write management directory;

(d) defining a plurality of second storage state indicators within said media, one second storage state indicator corresponding to each of said plurality of data storage portions;

(e) when one of said plurality of data storage portions is selected for writing, and when a storage state indicator has been previously selected for said data storage portion selected for writing and said storage state indicator is set to a read-only state, discontinuing said writing;

(f) when one of said plurality of data storage portions is selected for writing, and when a storage state indicator has not been previously selected for said data storage portion selected for writing, selecting one of said first storage state indicators or one of said second storage state indicators as a selected storage state indicator for said data storage portion selected for writing, wherein one of said first storage state indicators is selected so long as at least one of said first storage state indicators is unused, and wherein one of said second storage state indicators is selected when no unused first storage state indicators is available; and (g) setting said selected storage state indicator to a read only state.

12. The process of claim 11 wherein step (b) further comprises the step of assigning a single sector of said media to each of said data storage portions.

13. The process of claim 11 wherein step (c) further comprises the step of defining a plurality of pairs of pointers, each of said pair having a first pointer that contains an address of a start of one of said plurality of data storage portions, and each of said pair having a second pointer that contains an address of an end of said one of said plurality of data storage portions.

14. The process of claim 13 wherein step (b) further comprises the step of assigning one or more sectors of said media to each of said data storage portions.

15. The process of claim 11 further comprising the step of locating said second storage state indicator within each of said predefined data storage portions of said data storage media.

16. The process of claim 15 further comprising the step of defining a flag bit within each of said predefined data storage portions of said data storage media for containing said second storage state indicator.

17. The process of claim 11 wherein step (b) further comprises the step of assigning a zone of said media to each of said data storage portions.

18. The system of claim 17 wherein step (c) further comprises the step of defining each of said first storage state indicators as a pointer and wherein said pointer points to a first writable byte location in said zone.

* * * * *